United States Patent
Ooghe et al.

(10) Patent No.: US 10,241,618 B2
(45) Date of Patent: Mar. 26, 2019

(54) TOUCHSCREEN DISPLAY WITH MONITORING FUNCTIONS

(71) Applicant: BARCO NV, Kortrijk (BE)

(72) Inventors: Jurgen Ooghe, Gavere (BE); Bart Cappaert, Gentbrugge (BE)

(73) Assignee: BARCO NV, Kortrijk (BE)

( * ) Notice: Subject to any disclaimer, the term of this patent is extended or adjusted under 35 U.S.C. 154(b) by 152 days.

(21) Appl. No.: 15/310,242

(22) PCT Filed: May 13, 2014

(86) PCT No.: PCT/EP2014/059776
§ 371 (c)(1),
(2) Date: Nov. 10, 2016

(87) PCT Pub. No.: WO2015/172819
PCT Pub. Date: Nov. 19, 2015

(65) Prior Publication Data
US 2017/0139538 A1    May 18, 2017

(51) Int. Cl.
*G06F 3/041*    (2006.01)
*G06F 3/044*    (2006.01)

(52) U.S. Cl.
CPC ............ *G06F 3/0418* (2013.01); *G06F 3/044* (2013.01); *G06F 3/0412* (2013.01); *G06F 2203/04104* (2013.01)

(58) Field of Classification Search
CPC .................................................... G06F 3/0418
USPC ................................................. 345/173–178
See application file for complete search history.

(56) References Cited

U.S. PATENT DOCUMENTS

| | | | |
|---|---|---|---|
| 5,283,559 A * | 2/1994 | Kalendra | G06F 3/0418 345/156 |
| 2004/0140993 A1 | 7/2004 | Geaghan et al. | |
| 2011/0181523 A1 | 7/2011 | Grothe et al. | |
| 2012/0293455 A1* | 11/2012 | Shen | G06F 3/0418 345/174 |
| 2013/0113761 A1* | 5/2013 | van Lieshout | G06F 1/1643 345/178 |

(Continued)

FOREIGN PATENT DOCUMENTS

| CN | 1739083 A | 2/2006 |
|---|---|---|
| CN | 102809707 A | 12/2012 |

(Continued)

OTHER PUBLICATIONS

International Search Report (ISR) dated Jan. 8, 2015, for PCT/EP2014/059776.

(Continued)

*Primary Examiner* — Roy P Rabindranath
(74) *Attorney, Agent, or Firm* — Bacon & Thomas, PLLC

(57) ABSTRACT

A touchscreen display system that has a touchscreen display having an active area and an user-input area, a touchscreen controller and an auxiliary controller. The active area and the user-input area are connected to the touchscreen controller and to the auxiliary controller, where a part of the active area has at least one test area allocated for test operations. Instructions are provided to assert the test areas to states of validated touches, a response signal is provided relating to the coordinates corresponding to the validated touches, and the signal is compared with the initial instruction.

19 Claims, 6 Drawing Sheets

(56) References Cited

U.S. PATENT DOCUMENTS

2013/0120280 A1* 5/2013 Kukulski ............ G06F 3/04883
345/173

FOREIGN PATENT DOCUMENTS

| CN | 102830835 A | 12/2012 |
|---|---|---|
| EP | 0528598 A2 | 2/1993 |
| WO | 2009/023880 A2 | 2/2009 |

OTHER PUBLICATIONS

Written Opinion dated Jan. 8, 2015, for PCT/EP2014/059776.
International Preliminary Report on Patentability (IPRP) dated Jul. 27, 2016, for PCT/EP2014/059776.
Second Written Opinion dated Mar. 30, 2016, for PCT/EP2014/059776.
Chinese Office Action in related CN Application No. 201480078881.7, dated Nov. 2, 2018.

* cited by examiner

TOUCHSCREEN DISPLAY WITH MONITORING FUNCTIONS

The present invention relates to touchscreen displays and in particular touchscreen displays that can be monitored while operating as well as to methods of testing such touchscreen displays and software to implement these methods.

BACKGROUND OF THE INVENTION

There is an increasing use of touchscreen displays in a variety of fields. A common problem to solve is how to confirm a touch, and there is substantial prior art on ways to obtain this. One example is US20110181523A1 which discloses how the signals of the touch position coordinates of a first and a second sensor array are compared, and if they do not coincide, the touch is invalidated. In some fields, such as for example avionics, process control, bank terminals etc, there are additional safety-critical requirements to consider.

SUMMARY OF THE INVENTION

The present invention seeks to provide an alternative touchscreen display as well as methods of operating or testing such displays.

Touchscreen displays according to embodiments of the present invention have the advantage that input touch test signal given to a touchscreen controller can be monitored and validated during operation.

The present invention provides a touchscreen display system having a touchscreen display comprising an active area and an user-input area, a touchscreen controller and an auxiliary controller the active area and the user-input area being connected to the touchscreen controller, wherein a part of the active area comprises at least one test area allocated for test operations. This has the advantage that the test area can be used for confirmation of touches, sensitivity of the touchscreen etc.

The touchscreen display is preferably adapted to determine the congruency of first information related to an asserted test area and second information derivable from a response from that test area. The first and second informations may be co-ordinates of the test area, for example or a name of the test area such as "Test Area No. 6", for example. The asserted test area is preferably brought to a state of a validated touch.

PCAP touchscreens may be used with the present invention. In particular, the present invention may find advantageous use wherever it is useful to check that the touchscreen, the software and/or the electronic hardware is/are working properly. This can be for example for touchscreens in air traffic control rooms, terrestrial vehicle control rooms, aircraft cockpits, oil platform control rooms or any other mission critical control rooms. Embodiments of the present invention may find advantageous use in many processes with which it is useful to check in the few minutes before a process is to be started by means of touchscreen manipulations, that the touchscreens are working properly.

The user-input area can be smaller than the active area. This has the advantage that the test areas can be separate from the user-input area so that for example, the test areas can be located outside of the user-input area.

Alternatively the user-input area can be substantially equal in area to the active area. In this way there is maximum utilisation of active areas.

Alternatively, the test areas can be located within the user-input area. This can provide optimum use of active area.

The system may be adapted to provide instructions to assert the at least one test area to a state of validated touch, to receive said instructions and to provide a response signal relating to the validated touch or corresponding coordinates of the validated touch, said response signal being compared directly or indirectly with the initial instructions or, for example, said corresponding coordinates being compared directly or indirectly with the coordinates of the initially asserted test areas. This is a convenient way to determine whether touches are being detected correctly. Indirect comparison can be the comparison of derived signals, for example hash values of the co-ordinates can be compared.

A unit that can be adapted to compare directly or indirectly said response signal with the initial instructions or, for example to compare directly or indirectly the corresponding coordinates with the coordinates of the initially asserted test areas. By making a dedicated comparison unit, there is considerable flexibility of where this unit is placed. For example it can be placed remotely and hence allow remote review and validation.

The auxiliary controller can be adapted to provide an instruction to assert the at least one test area to a state of a validated touch, the touchscreen controller can be adapted to receive said instruction and to provide a response signal corresponding to the state or to provide corresponding coordinates to said state, whereby said response signal or said corresponding state is/are sent to the auxiliary controller which is adapted to compare directly or indirectly the response signal with the initial instruction or, for example to compare directly or indirectly the corresponding coordinates with the coordinates of the initially asserted test areas. Any comparison method can be used which confirms or denies the congruency. This provides a compact stand-alone device which can provide local information relating to whether touch states are being detected correctly.

A valid touch/release can be simulated by connecting/disconnecting the at least one test area to ground or to constant potential reference. This is a simple but reliable method to simulate a touch.

For example, a switch can be provided for connecting/disconnecting the at least one test area to ground or to constant potential reference. Switches are reliable and economical components. Any suitable switches may be used such as electronic switches such as FET; or bipolar, or relay's, or anything like this.

The switch can be provided for connecting the at least one test area to ground or to constant potential reference through a serial impedance. This allows an estimate of the touchscreen sensitivity to be determined.

The adjustable impedance can be a plurality of impedances with different values, and the switch is adapted to select one of these impedances. Use of discrete components is a simple and effective way of making an adjustable impedance.

A plurality of test areas can be provided, the system being adapted to move the validated touch along or within said plurality of test areas. This allows different types of diagnostic tests to be carried out, for example, to test a zoom operation.

The test areas can be divided into sub-areas smaller than the area of one user-touch. This saves space.

In another aspect, the present invention provides a method for testing a touchscreen display system having a touchscreen comprising an active area and a user-touch input area and test areas, comprising the steps of providing an instruction to assert a test area to a state of a validated touch, providing a response signal related to validated touch or providing coordinates corresponding to the validated touch, and comparing directly or indirectly the response signal with the initial instruction or, for example comparing directly or indirectly the corresponding coordinates with the initial information used to assert the at least one test area or to compare directly or indirectly the corresponding coordinates with the coordinates of the initially asserted test area. Any comparison method can be used which confirms or denies the congruency.

The method may comprise the step of asserting a valid touch/release of a coordinate within a test area by connecting/disconnecting said coordinate to ground or to constant potential reference.

The step of connecting/disconnecting said coordinate to ground or to constant potential reference can be through an adjustable impedance.

The adjustable impedance can be a plurality of impedances with different discrete values, and a switch is used to select one of these values.

The method may include outputting a value based on the value of the adjustable impedance at which a touch detection is first confirmed, as a value relating to the sensitivity of the touchscreen.

The method may include the step of asserting a continuous sequence of sub-areas smaller than the area of a user-input touch to test a drag operation.

In another aspect the present invention provides a method having the step of simultaneously asserting two sub-areas, each smaller than the area of a user-input touch, and increasing or decreasing the distance between said sub-areas to test a zoom operation.

When the touchscreen display system has a touchscreen controller and an auxiliary controller, the active area can be coupled or connected to the touchscreen controller and optionally to the auxiliary controller. The auxiliary controller can provide the instruction to assert a test area to a state of a validated touch, the touchscreen controller can receive said instruction and provide a response signal relating to said validated touch or to provide corresponding coordinates of the validated touch, said response signal or said corresponding coordinates can be sent to a compare unit which compares directly or indirectly the response signal with the original instruction or compares directly or indirectly the corresponding coordinates with the coordinates of the initially asserted area. Any comparison method can be used which confirms or denies the congruency.

The method can comprise simulating a valid touch/release by connecting/disconnecting the at least one test area to ground or to constant potential reference, which can include moving a validated touch along said plurality of test areas. This allows testing a zoom operation.

In another aspect the present invention provides a computer program product comprising code sections which when executed on a processing engine performs any method of embodiments of the present invention. The computer program product can be stored on a non-transitory signal storage medium.

In another aspect the present invention provides a touchscreen display system having a touchscreen comprising an active area and a user-touch input area and test areas, comprising:

first means for providing an instruction to assert a test area to a state of a validated touch, second means for providing a response signal related to the validated touch or, for example coordinates corresponding to the validated touch, and Means for comparing the response signal directly or indirectly with the initial instruction or to compare directly or indirectly the corresponding coordinates with the coordinates of the initially asserted test area or to make any other comparison which confirms or denies the congruency.

BRIEF DESCRIPTION OF THE DRAWINGS

The invention will be described with reference to the following drawings which are schematic.

DEFINITIONS

Figure 1:
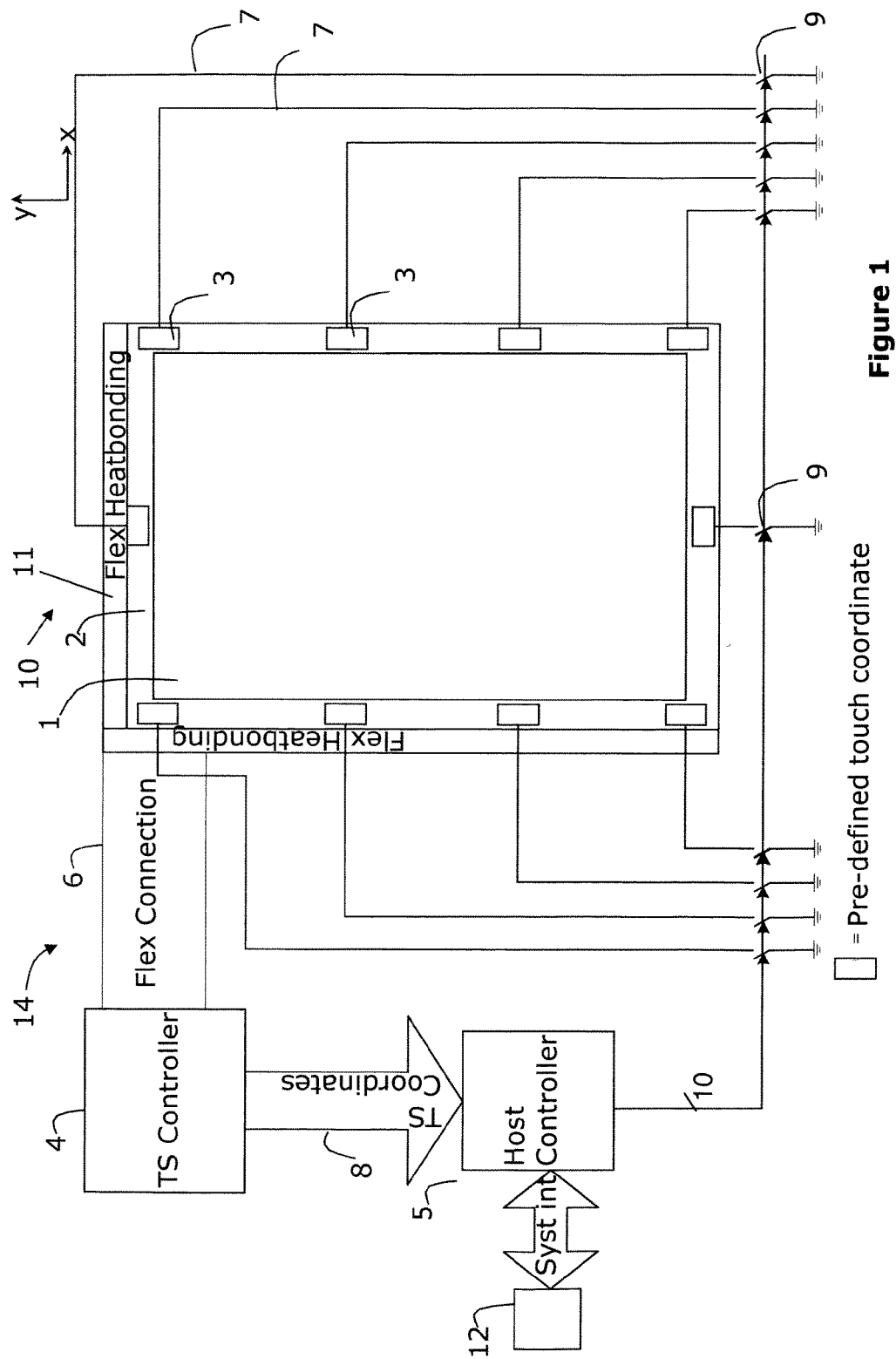
FIG. 1 shows a layout of an embodiment of the present invention where a multiple of test areas are placed outside the user-input area.

A "test signal" as used in this invention relates to any signal is provided to test areas of the touchscreen and which emulates a touch such as a simulated or artificial touch of the touch screen. Such a test signal may be a single pulse, a wave shaped pulse, a sequence of pulses, a sequence of waves, etc. The test signal may be digital or analog. A test signal does not need to be identical to a physical touch, for example a test may emulate a touch that is much shorter than the validation time of one user-touch.

A "touch" as used in this invention relates to any user action which records the proximity of an object to the touch screen such that its presence is detected. The touch can be made with the human finger or an object such as a stylus. A "touch" does not imply a physical contact necessarily, proximity may be sufficient, but a physical touch is preferred.

A "simulated or artificial touch" of the touch screen relates to eliciting electronically a response from a touch screen as if that screen had been touched.

The term "coordinates" when referring to test areas relates to any coordinate system that can be used to identify a test area. Such a coordinate system does not have to be related to any specific known system such as Cartesian coordinates. All that the coordinates need to do is to identify the location of a test area.

"PCAP touchscreens" relate to Projected Capacitive Touch (PCAP or also called PCT) technology. There are various types of PCAP screens such as mutual capacitance and self-capacitance. Some touchscreens have multi-touch operation, i.e. more than one finger, palm or stylus can be accurately tracked at the same time. PCAP touchscreens are made up of a matrix of rows and columns of conductive material, layered on sheets of glass. This can be done, for example by etching a single conductive layer to form a grid pattern of electrodes, or by etching two separate, perpendicular layers of conductive material with parallel lines or tracks to form a grid. Voltage applied to this grid creates a uniform electrostatic field, which can be measured. When a conductive object, such as a finger or stylus, comes into contact with a PCAP panel, it distorts the local electrostatic field locally. This is measured as a change in capacitance. If a finger bridges the gap between two of the "tracks", the charge field is further interrupted and detected by a controller. The capacitance can be changed and measured at every individual point on the grid, i.e. at each intersection. Therefore, this system is able to accurately track touches. Due to the top layer of a PCAP being glass, it is a robust solution. Additionally, unlike traditional capacitive touch technology, it is possible for a PCAP system to sense a passive stylus or gloved fingers. "Mutual capacitance" sensors have a capacitor at every intersection of each row and each column. A voltage is applied to the rows or columns and proximity of a finger or conductive stylus to the surface of the sensor changes the local electrostatic field which reduces the mutual capacitance. The capacitance change at every individual point on the grid is measured to accurately determine the touch location by measuring the voltage in the other axis.

"Self-capacitance" sensors can have the same X-Y grid as mutual capacitance sensors, but the columns and rows operate independently. With self-capacitance, the capacitive load of a finger is measured on each column or row electrode by a current meter. This method produces a stronger signal than mutual capacitance, but it is unable to resolve accurately more than one finger.

"Congruency" as used in the present invention relates to the quality or state of corresponding or agreeing between the definition of a test area that has been specified or asserted and the response from that test area, i.e. that the co-ordinates as specified or asserted agree with what is understood from the response, i.e. refer to the same test area.

"Ground" refers to a reference point in an electrical circuit from which voltages are measured and a common return path for electric current. It often refers to a direct physical connection to the earth but the present invention is not limited thereto. The "ground" can be set to a potential such as 0.5 Volt provided it fulfils the requirements of being the reference voltage and also being able to take current.

DETAILED DESCRIPTION OF THE INVENTION

The present invention will be described with respect to particular embodiments and with reference to certain drawings but the invention is not limited thereto but only by the claims.

The drawings described are only schematic and are non-limiting. In the drawings, the size of some of the elements may be exaggerated and not drawn on scale for illustrative purposes.

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

In the drawings, like reference numerals indicate like features; and, a reference numeral appearing in more than one figure refers to the same element.

FIG. 1 shows a first embodiment of the present invention. The details of the first embodiment are included explicitly in each of the second to fifth embodiments. The same reference numerals in the figures refer to the same or equivalent elements. The touchscreen display system 14 comprises a touchscreen display 10, a touchscreen controller 4, hereafter referred to as the TS controller, and comprises or is for use with an auxiliary controller 5, hereafter referred to as the AUX controller and the remaining system 12. The touchscreen controller and/or the auxiliary controller can be implemented as microcontrollers as embedded processors or as hardware logic arrays for example. The active area 11 comprises or consists of a user-input area 1 and a border area 2 outside the user-input area 1. The border area 2 may be present along the complete length of the border of and outside of the user-input area 1 or may be present only at discrete positions along the border. The user-input area 1 is the area available for the user to provide input touches upon. The user could be human or non-human, e.g. a machine. The border area 2 is also part of the active area 11 that includes or involves touch sensors, but no input can be provided by the user in this area. The border area 2 does not need to be visible or accessible to the user. For instance the border area can be placed under a bezel or in any other way be screened from input touches or may be provided with an indication such as a colour that this area is not for use by the user. In this embodiment allocated test areas 3, hereafter referred to as test areas, are distributed along the border 2 and outside the user-input area 1. The size of these test areas can correspond to the size of one user-touch. If the user is human this could for example be about 6 mm or a typical size of a finger, but need not be limited hereto. The "user" may also be a stylus manipulated by a person or a robot. In FIG. 1 only two test areas 3 have been numbered for readability but the present invention is not limited to just two. The test areas 3 are further connected via connectors 7 (only two indicated for readability) or coupled to ground 9 (only two indicated for readability) or to constant potential reference such as 0.5 Volt, the AUX controller 5 and the touchscreen controller 4. The touchscreen system 14 is adapted so that an instruction is provided to the test areas 3, which instruction emulates a touch such as a simulated or artificial touch. Hence, the touchscreen system 14 is adapted so that a test signal is provided to the test areas 3. This signal can emulate a touch such as a simulated or artificial touch. For example, the AUX controller 5 can be adapted to provide the instruction, i.e. the test signal to the test areas 3. In response to the transmitted test signal, the test areas produce a response signal, and the touchscreen controller 4 receives this response signal. The response signal can be of the same type of input as if the active area were touched by a user. The touchscreen controller 4 is connected or coupled to the auxiliary controller 5 via the connector 8. The received response signal received from the touchscreen controller 4 is compared directly or indirectly with the test signal sent to the allocated test areas 3. For example, the touchscreen controller 4 can provide the received response signal to the AUX controller 5 via the connector 8. The AUX controller 5 then compares directly or indirectly the received response signal received from the touchscreen controller 4 with the test signal it sent to the test areas 3. In particular embodiments of the present invention provide a method or a system for testing a touchscreen display system 14, the touchscreen display system 14 further having a touchscreen controller and an auxiliary controller, an active area being coupled or connected to the touchscreen controller and to the auxiliary controller, wherein the auxiliary controller provides an instruction to assert a test area to a state of a validated touch, the touchscreen controller receives said state and provides corresponding coordinates to a compare unit which compares them directly or indirectly with the coordinates of the initially asserted test areas. In this embodiment the response signal comprises the information relating to the coordinates of the validated touch of the asserted test area. The purpose is to confirm the congruency between the asserted test area and the information in the response signal obtained from the asserted test area. More than one test area may be asserted at one time, thus there can be multiple response signals. This is possible for multi-touch screens.

It is included within the scope of the present invention that the transmitted test signal and the received response signal are compared directly or indirectly by another unit. This comparing unit may be internal or external to the touchscreen system 14. If external it can be provided with connections to the touchscreen system 14 to send or to receive the sent test signal and the received response signals. Alternatively the compare unit may be incorporated remotely such as in a server which is accessible by means of a local or wide-area network such as the Internet. This allows a remote assessment and confirmation of the operation of the touchscreen, e.g. by an independent review body. To allow Internet connection the touchscreen system 14 can have a network card.

Figure 2:
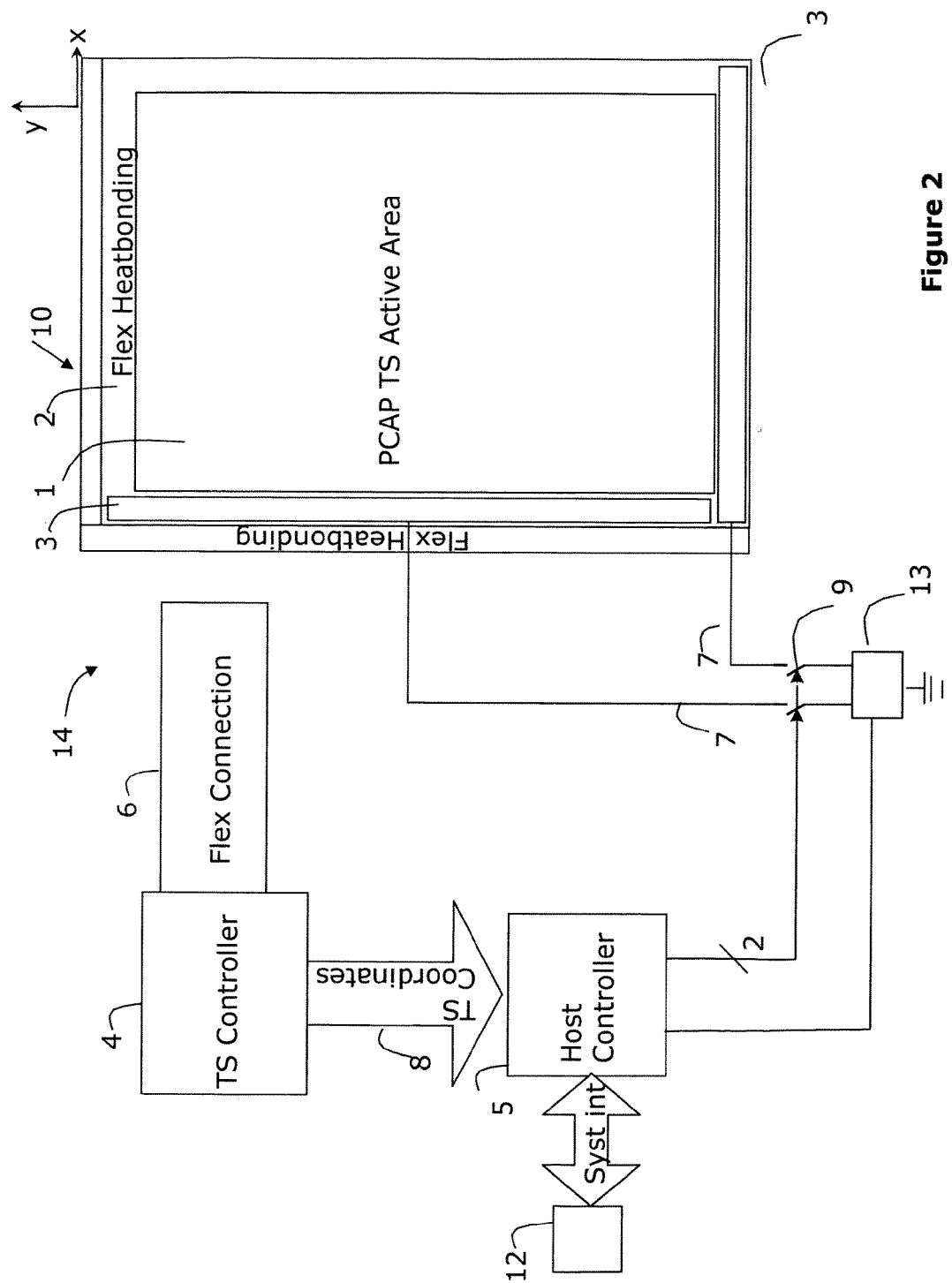
FIG. 2 shows an embodiment of the present invention where a multiple of larger test areas are placed outside the user-input area.

The test areas 3 can be static conductive zones that can be floating or grounded or can be connected to ground through an impedance 13 as described with respect to FIG. 2 or can be connected to a constant potential reference. The test areas may be optionally grounded through switches 9 so that the test areas may be either floating or grounded depending upon the position of the switches 9. Any suitable switches may be used such as electronic switches such as FET; or bipolar, or relay's, or anything like this.

A grounded test area will be reported as a valid touch and opening a switch 9 will be reported as a release. The number of test areas will decide how many coordinates that can be tested in x and y direction respectively. With this method it is possible to check the display functions of a third party touchscreen controller, thus the method is controller independent. Because it is known upfront which coordinate should be reported it is possible to check the touchscreen controller such as 4 by an AUX controller such as 5 or by another compare unit. For avionics applications, the AUX controller can be designed to comply with required DAL (Design Assurance Level). It is advantage of embodiments of the present invention that even when confronted with a touchscreen controller is a "black box" to which no access is available to its internal workings, the AUX controller can still be provided to carry out the necessary to control and test functions.

As a further option that can be applied to any of the embodiments of the present invention, a sensitivity of the touchscreen can be read out. For example the sensitivity can be read out from the touchscreen controller 4. If the touchscreen controller 4 is integrated as a black box there is no information on its current touch sensitivity. In any of the embodiments of the present invention, an indirect way of measuring the sensitivity can be implemented. For example the environment can be detected followed by adapting the actions taken upon a press. In any embodiment of the present invention it can be useful for safety reasons to reduce or eliminate actions with significant consequences if the reliability is not guaranteed due to the environment.

In accordance with any of the embodiments of the present invention an adjustable serial load 13 (see FIG. 2) can be placed in series with ground (or with a constant potential reference) and the test areas. The adjustable serial load 13 can be an adjustable impedance such as a resistor, capacitor or an inductor. An adjustable impedance also includes a plurality of discrete impedances such as resistors, capacitors or inductors and a switch 9 which can select any one of these discrete impedances. Thus the switch 9 of FIG. 1 may switch through an impedance 13 to ground or to a constant potential reference. In any of the embodiments of the present invention the adjustment of the impedance value changes the apparent force with which the artificial press is executed. Then in dependence upon the impedance value selected the presence of a detection can be monitored. The lower the impedance at which a touch detection is made, the less sensitive is the screen. Conversely, a valid touch event detected with a high serial impedance, e.g. equivalent resistance indicates a very sensitive touchscreen and therefore reliable touch events can be expected. Thus by altering the value of the series impedance it is possible to obtain a value that relates to the sensitivity of the touchscreen. Test carried out over time can also indicate if there is a deterioration of the touchscreen. In accordance with any of the embodiments of the present invention, a value may be output relating to the sensitivity of the touchscreen, e.g. based on the value of the adjustable impedance at which a touch is first detected being a value relating to the sensitivity of the touchscreen. The above text describes how the AUX controller 5 reports all information to the remaining system 12, so that input from the TS controller is provided via the AUX controller. It is however possible that the TS controller 4 reports directly to the remaining system 12. In this case some supporting functions for filtering out possible test coordinates should be provided, for example by the AUX controller 5. This alternative configuration may increase efficiency; the essential parts of the invention remain the same.

FIG. 2 illustrates a second embodiment of the present invention where the test areas 3 occupies larger areas along the border 2, which is also here placed outside the user-input area 1.

All other details described for FIG. 1 are included in this embodiment except for the new features such as the length of the test areas. This implementation makes it possible to test all coordinates in the x- and y direction respectively. As indicated above in accordance with any of the embodiments of the present invention an adjustable serial load 13 can be placed as shown in FIG. 2 in series with ground (or with a constant potential reference) and the test areas. The adjustable serial load 13 can be an adjustable impedance such as a resistor, capacitor or an inductor. An adjustable impedance also includes a plurality of discrete impedances such as resistors, capacitors or inductors and a switch 9 which can select any one of these discrete impedances. In any of the embodiments of the present invention the adjustment of the impedance value changes the apparent force with which the artificial press is executed. Then in dependence upon the impedance value selected the presence of a detection can be monitored. The lower the impedance at which a touch detection is made, the less sensitive is the screen. Conversely, a valid touch event detected with a high serial impedance, e.g. equivalent resistance indicates a very sensitive touchscreen and therefore reliable touch events. Thus by altering the value of the series impedance it is possible to obtain a value that relates to the sensitivity of the touchscreen. Test carried out over time can also indicate if there is a deterioration of the touchscreen. In accordance with any of the embodiments of the present invention, a value may be output based on the value of the adjustable impedance at which a touch is first detected as a value relating to the sensitivity of the touchscreen.

Figure 3:
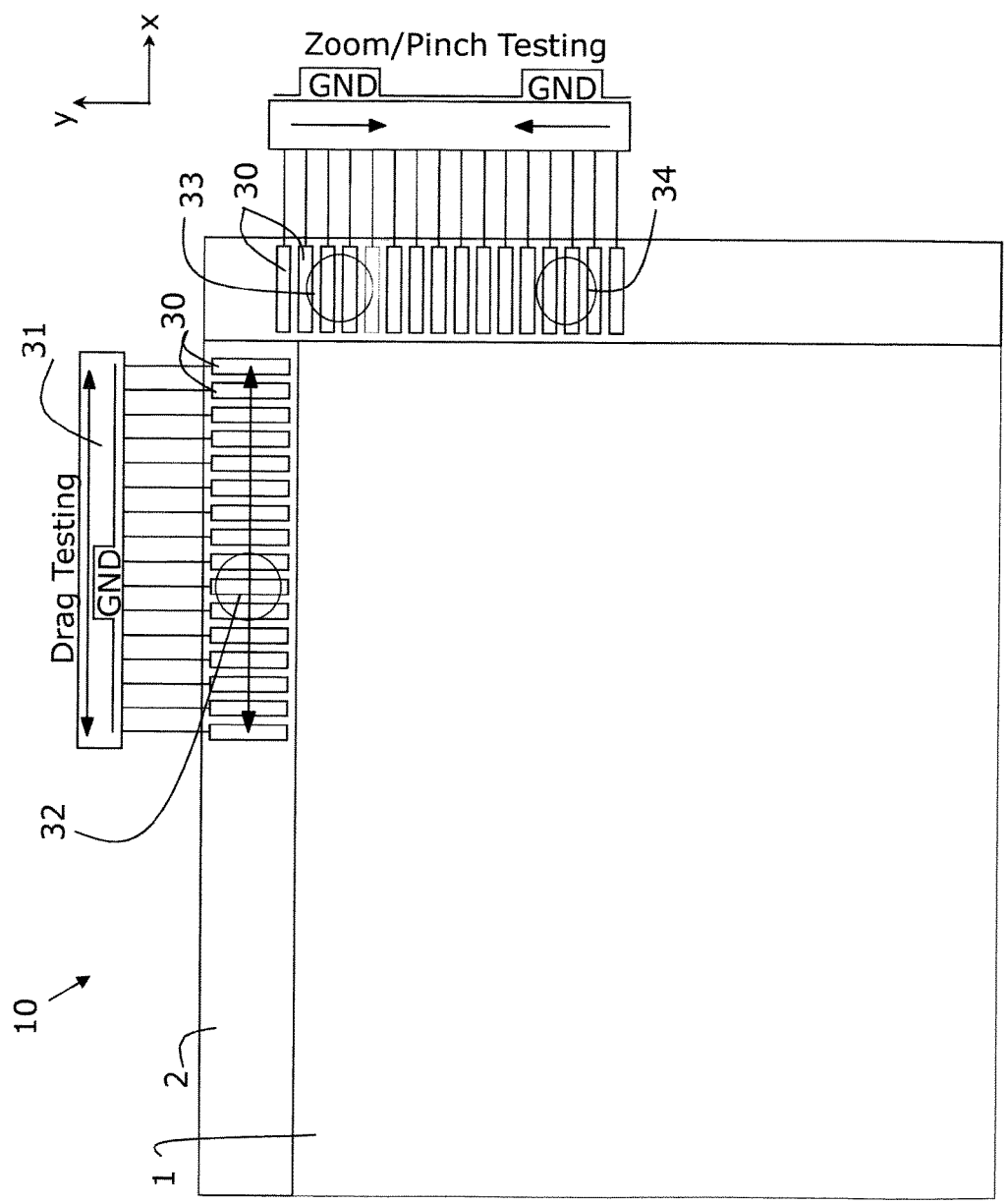
FIG. 3 shows an embodiment of the present invention where the test areas have been subdivided into smaller areas.

FIG. 3 shows a third embodiment of the present invention. The test areas 3 of FIGS. 1 and 2 have been subdivided into smaller test areas 30 (only two are indicated for readability), in order to increase the resolution. The touchscreen system 14 is adapted so that within a multiple of such smaller test areas an artificial touch 32 and its movement along the border 2 is defined an detected. For example, within the multiple of such smaller test areas the AUX controller can detect an artificial touch 32 and its movement along the border 2. The touchscreen system 14 is adapted so move the touch 32 along the border 2. For example, the auxiliary controller can be adapted to move the touch 32 along the border 2. In this way a drag operation is tested, e.g. the AUX controller tests a drag operation. A second artificial touch can be added so that there are two artificial touches within the same test area. For example, the auxiliary controller can be adapted to add a further artificial touch in the same test area as an existing touch. This is shown with respect to touches 33 and 34, with which it is possible to test a zoom operation where 33 and 34 are moved closer to each other or further apart from each other. For example, the auxiliary controller can be adapted to move the touches 33, 34 closer to each other or further apart from each other. All other details described for FIG. 1 and/or for FIG. 2 are expressly included in this embodiment except for the new elements such as the smaller test areas 30, and the touches 32, 33 and 34 and test for a drag or a zoom operation.

Figure 4:
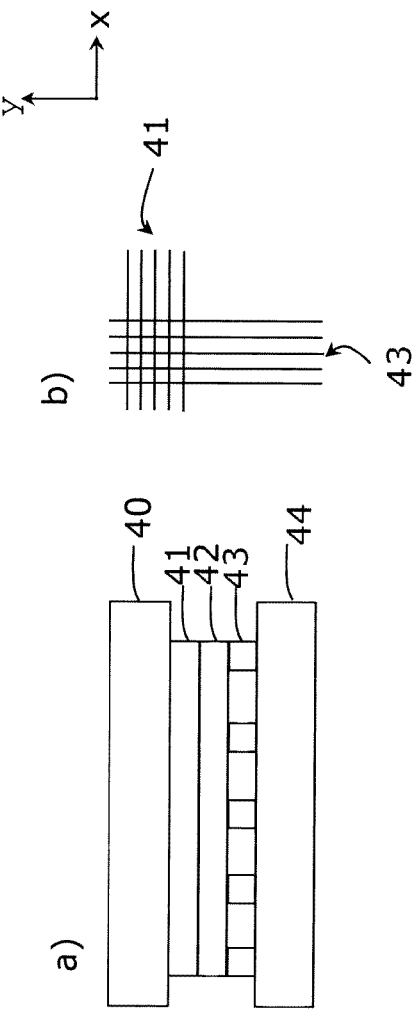
FIG. 4 shows a cross-section and a top view of an embodiment of the present invention.

FIG. 4 a) illustrates a cross section at a test area coordinate of a fourth embodiment of the present invention. This design of test area can be used with any of the first to third embodiments of the present invention and details of these embodiments are incorporated expressly in the fourth embodiments as options. Reference numbers 40 and 44 refer to substrates. These substrates can be for example glass or polymer. Reference numbers 41 and 43 are transparent conductors or conductors that are small in size so that they obscure very little. These conductors have been brought into line shapes that are oriented with 90 degrees angle to each other. FIG. 4 b) shows a top view the orientation of conductor lines 41 and 43. The conductors could for example be indium tin oxide (ITO), copper wire, carbon nanotubes or any conductive material suitable for conductors. The Layer 42 is an optically clear adhesive. This configuration makes it possible to access and test any coordinate within the user-input area 1. All other details described for FIG. 1 and/or for FIG. 2 and/or for FIG. 3 are included in this embodiment except for the substrates 40 and 44 and the conductors 41 and 43.

Figure 5:
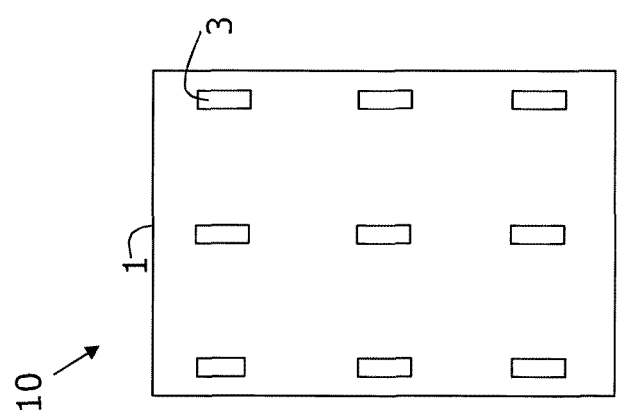
FIG. 5 shows an embodiment of the present invention where the test electrodes are put inside the active area.

FIG. 5 illustrates a fifth embodiment of the present invention where the active area 10 and the user input area 1 can have substantially the same size. They are positioned just on top of each other so that there is no border area 2 present. The test areas 3 can then be put within the user input area, so the conductors have to be transparent for the eye. A user-input can be differentiated from a touch provided by the AUX controller by measuring the touch duration. Since a human input is by nature slower than an electrical assertion, it is possible to let the validation time for test touches be much shorter than the validation time of one user-touch. Such a limitation could for example be 300 ms for a human touch and 100 ms for an electrical test touch, but should not be limited hereto. With this embodiment it can also be possible to detect contamination on the screen. It is also possible to implement drag- and zoom operations within the user-input area using the smaller test patterns 30 as shown in FIG. 2. The details of any of the first to fourth embodiments are included expressly in this embodiment at least as options.

Figure 6:
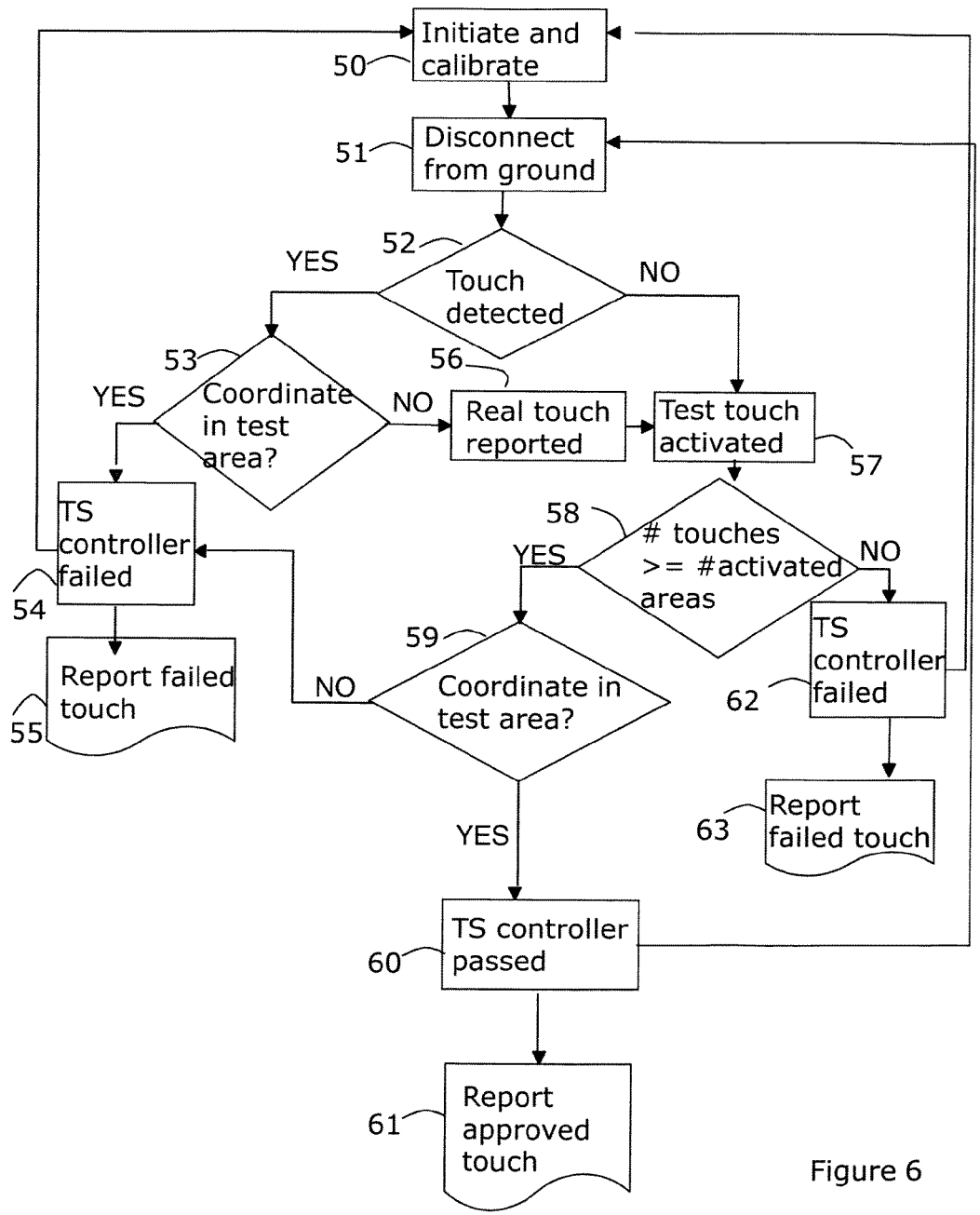
FIG. 6 shows a flow chart describing an embodiment of the present invention.

FIG. 6 shows a flow chart describing the method steps of a sixth embodiment of the present invention. This flow can be implemented and is expressly incorporated in any of the first to fifth embodiments. The touchscreen system 14 is initiated and calibrated in step 50 and in step 51 all test areas are disconnected from ground (or from a constant potential reference) so that they are floating. This disconnection can be performed by opening the switches 9 of FIG. 1. The signals to open the switches 9 are provided by the touchscreen system 14, e.g. by the touchscreen controller. While the test areas are floating, the touchscreen system 14 such as the AUX controller 5 or other unit checks if a touch is anyhow detected, step 52. If this is the case the touchscreen system 14 is adapted to check, in step 53, if the coordinates of the touch or touches are equivalent to the coordinates within the allocated test areas, hereafter referred to as the test area coordinates. This comparison is done by means of a lookup table or similar and can be carried out in the AUX controller or in another compare unit. If this is the case, the TS controller has failed, step 54, since the contacts of the test area coordinates are disconnected at this stage and hence there should be no touch detected, and in step 55 failure is reported to the remaining system 12 by the AUX controller 5 or by another unit. If the touch coordinates are not found among the test area coordinates, they are identified as a user-touch. The touchscreen system 14 is adapted to approve the touch co-ordinates, for example the touch coordinates are approved by the AUX controller or by another unit and the TS controller 5 or the AUX controller 4 reports the user-inputcoordinates to the remaining system 12 in step 56. The actual test signal starts in step 57 where the touch screen system 14, e.g. the AUX controller 5 activates touch signals for one or several coordinates in the test areas. The touches are detected by the touchscreen system 14, e.g. the TS controller 4 which reports them to the remaining system 12 and/or to the AUX controller 5. The touchscreen system 14 is adapted to compare, e.g. auxiliary controller 5 compares the activated touches with the actual touches reported by the TS controller 4.

If the actual touches reported by the TS controller 4 are less than the amount of touches the touchscreen system 14 activated, e.g. the AUX controller 5 activated, the TS controller 4 did not perform the task (step 62) and there is a failure reported by the touchscreen system 14, e.g. the AUX controller 5 to the remaining system 12 (step 63). If the coordinates of the actual touches reported by the TS controller 4 are equal to (i.e. congruent with) the touches activated by the AUX controller 5 the touches can be approved. The touchscreen system 14 in step 59 checks if the touch coordinates lie within the test area, e.g. this is performed by AUX controller or another unit. If this is not the case the TS controller 4 has failed (step 54) since the only touches active at this stage should be the ones activated by the AUX controller 5 within the test areas. The touchscreen system 14 is adapted to report, e.g. the AUX controller reports a failure to the remaining system 12 (step 55). If the touch coordinates lies inside the test area and exactly match the touches activated by the AUX controller 5, the TS controller has succeeded to complete its task and the touch or touches are approved e.g. by the AUX controller. The touchscreen system 14, e.g. the AUX controller can now report the touch or touches to the remaining system 12 (step 60) and it may launch a new test signal starting with 51.

Methods and systems according to embodiments of the present invention can be implemented on computer equipment or a microcontroller that is/are adapted to implement methods of the present invention. Such a computer or microcontroller includes a processor and memory. The computer or microcontroller has means for driving the touchscreen system 14. The computer or microcontroller may have a memory which stores data and also machine-readable instructions which, when executed by the processor cause the processor to perform the described methods.

The computer or microcontroller typically includes a Central Processing Unit ("CPU"), such as a conventional microprocessor of which a Pentium processor supplied by Intel Corp. USA is only an example, and a number of other units interconnected via bus system. The bus system may be any suitable bus system. The computer or microcontroller includes at least one memory. Memory may include any of a variety of data storage devices known to the skilled person such as random-access memory ("RAM"), read-only memory ("ROM"), and non-volatile read/write memory such as a hard disc as known to the skilled person. For example, the computer or microcontroller may further include random-access memory ("RAM"), read-only memory ("ROM"). The computer or microcontroller may also have a system bus connected to an input/output (I/O) adapter for connecting the touchscreen system to peripheral devices or to remote equipment such as servers.

The computer or microcontroller can also include a graphical user interface that resides within machine-readable media to direct the operation of the computer. Any suitable machine-readable media may retain the graphical user interface, such as a random access memory (RAM), a read-only memory (ROM), a magnetic diskette, magnetic tape, or optical disk (the last three being located in disk and tape drives). Any suitable operating system and associated graphical user interface (e.g., Microsoft Windows, Linux) may direct the CPU. In addition, computer or microcontroller includes a control program that resides within memory storage. Control program contains instructions that when executed on CPU allow the computer or microcontroller to carry out the operations described with respect to any of the methods of the present invention.

The computer program product for carrying out the method of the present invention can reside in any suitable memory and the present invention applies equally regardless of the particular type of signal bearing media used to actually store the computer program product. Examples of computer readable signal bearing media include: recordable type media such as floppy disks and CD ROMs, solid state memories, tape storage devices, magnetic disks.

Accordingly, the present invention also includes a software product which when executed on a suitable computing device carries out any of the methods of the present invention. Suitable software can be obtained by programming in a suitable high level language such as C and compiling on a suitable compiler for the target computer processor. Such methods will now be described.

The present invention also provides a computer program product in the form of software comprising code sequences. The software can, for example, be compiled for execution with a target microprocesor or can be written in an interpretative language such as Java or can be for use with a gate array such as an FPGA. Hence, the code sequences re adapted to execute on a processing engine such as a microprocessor or an FPGA for example. However the functions performed by the executing software can equally well be done in hardware, e.g. by means of logic circuits with logic gates. Whether run as hardware or software, the computer program product when executed on a processing engine provides testing of a touchscreen display system having a touchscreen comprising an active area and a user-touch input area and test areas, the software being adapted to provide an instruction to assert one or more test areas to a state of a validated touch or to states of validated touches. The signal can be digital and then converted to analog to drive the test area, for example. The software can be adapted to detect a response signal related to the coordinates corresponding to the validated touché(s), and to compare the signal with the initial instruction. The software may be adapted to assert a valid touch/release of a coordinate within a test area by providing a signal or signals that allow connecting/disconnecting said test area to ground or to constant potential reference. The software may be adapted to assert a continuous sequence of sub-areas smaller than the area of a user-input touch to test a drag operation. The software may be adapted simultaneously assert two sub-areas, each smaller than the area of a user-input touch, and increasing and/or decreasing the distance between said sub-areas to test a zoom operation. The software may be adapted to cause an auxiliary controller to provide an instruction to assert a test area to a state of validated touch, and to cause the touchscreen controller to provide a response signal related to corresponding co-ordinates of the asserted test area. The software may also be adapted to send said response signal to a compare unit which compares it with the initial instruction from the auxiliary controller. The software may also be adapted to allow simulation of a valid touch/release by allowing connecting/disconnecting of the at least one test area to ground or to constant potential reference. The software may also be adapted to move a validated touch along said plurality of test areas. The software may also be adapted to test a zoom operation.

The particular combinations of elements and features in the above detailed embodiments are exemplary only. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and claims do not limit the scope of the invention as claimed.

The invention claimed is:

1. A touchscreen display system having a touchscreen display comprising an active area and an user-input area, a touchscreen controller and an auxiliary controller,
the active area and the user-input area being connected to the touchscreen controller,
wherein a part of the active area comprises at least one test area allocated for test operations, said at least one test area being outside or inside of the user-input area, the touchscreen display system being adapted to provide an instruction to assert the at least one test area to a state of a validated touch and comprising means for determining congruency between first information relating to an asserted test area and second information derivable from a response of the at least one test area,
wherein if said at least one test area is inside the user-input area, the means for determining congruency between the first and second information is further adapted to measure the touch duration,
wherein the auxiliary controller is adapted to provide the instruction to assert the at least one test area to a state of the validated touch, the touchscreen controller is adapted to receive said instruction and to provide a response signal or coordinates corresponding to the validated touch, wherein said response signal or said corresponding coordinates are sent to the auxiliary controller which is adapted to compare directly or indirectly the response signal with initial information used to assert the at least one test area or to compare directly or indirectly the corresponding coordinates with the coordinates of the initially asserted test area.

2. The touchscreen display system according to claim 1, wherein a validation time for the validated touch is selected from:
a time shorter than a validation for user touches, and
any one of or combination of the following attributes: the validated touch being at most 100 ms, and the user touches being at least 300 ms.

3. The touchscreen display system according to claim 1, wherein the user-input area is selected from any one of or combination of the following attributes: it is smaller than the active area and it is equal to the active area.

4. The touchscreen display system according to claim 1, said touchscreen display system adapted to receive said instruction and to provide corresponding coordinates which correspond to the validated touch, said corresponding coordinates being compared directly or indirectly with the coordinates of the initially asserted at least one test area.

5. The touchscreen display system according to claim 1, said touchscreen display system adapted to receive said instruction and to provide a response signal that corresponds to the validated touch, said response signal being compared directly or indirectly with the initial information used to assert the at least one test area.

6. The touchscreen display system according to claim 1, wherein a valid touch/release is simulated selected from connecting/disconnecting the at least one test area to/from ground and
connecting/disconnecting the at least one test area to/from to a constant potential reference.

7. The touchscreen display system according to claim 6, wherein a switch is selected from
a switch connecting/disconnecting the at least one test area to/from ground, and
a switch connecting/disconnecting the at least one test area to/from a constant potential reference, and
a switch connecting the at least one test area to ground through an adjustable impedance, and
a switch connecting the at least one test area to a constant potential reference through a serial impedance.

8. The touch screen display system according to claim 7, wherein the adjustable impedance is a plurality of impedances with different values, and the switch is adapted to select one of these impedances.

9. The touchscreen display system according to claim 1, comprising a plurality of test areas, the system being adapted to move the validated touch along said plurality of test areas.

10. The touchscreen display system according to claim 9, said touchscreen display system adapted to test a zoom operation.

11. The touchscreen display system according to claim 1, wherein test areas are divided into sub-areas smaller than a user-touch of 6 mm.

12. A method for testing a touchscreen display system having a touchscreen comprising an active area, a user-touch input area and test areas, said test areas being outside or inside the user-input area, the touchscreen display system further having a touchscreen controller and an auxiliary controller, the active area being coupled or connected to the touchscreen controller and to the auxiliary controller, the method comprising the steps of:
providing an instruction to assert the test areas to states of validated touches,
providing a response signal that corresponds to the validated touches or coordinates corresponding to the validated touches, and
comparing the response signal directly or indirectly with initial instructions used to assert the test areas or comparing directly or indirectly the corresponding coordinates with coordinates of initially asserted test areas,
wherein if said test area is inside the user-input area, the step of comparing the response signal or the coordinates further comprises the step of measuring the touch duration,
wherein the auxiliary controller provides an instruction to assert a test area to a state of the validated touch, wherein said response signal or said corresponding coordinates are sent to the auxiliary controller which is adapted to compare directly or indirectly the response signal with the initial information used to assert the test areas or to compare directly or indirectly the corresponding coordinates with the coordinates of the initially asserted test areas.

13. The method for testing a touchscreen display system according to claim 12, comprising the step of asserting a valid touch/release of a coordinate within a test area selected from:
connecting/disconnecting said coordinate to/from ground, and
connecting/disconnecting said coordinate to/from a constant potential reference, and
connecting/disconnecting said coordinate to ground through an adjustable impedance, and
connecting said coordinate to a constant potential reference through an adjustable impedance.

14. The method for testing a touchscreen display system according to claim 13, further comprising outputting a value based on the value of the adjustable impedance at which a touch detection is first confirmed, as a value relating to the sensitivity of the touchscreen.

15. The method for testing a touchscreen display system according to claim 13, comprising the step of asserting a continuous sequence of sub-areas smaller than a user-input touch of 6 mm to test a drag operation; and simultaneously asserting two sub-areas, each smaller than a user-input touch of 6 mm, and increasing or decreasing the distance between said sub-areas to test a zoom operation.

16. The method for testing a touchscreen display system according to claim 12, comprising the step of asserting a continuous sequence of sub-areas smaller than a user-input touch of 6 mm to test a drag operation; and simultaneously asserting two sub-areas, each smaller than a user-input touch of 6 mm, and increasing or decreasing the distance between said sub-areas to test a zoom operation.

17. The method for testing a touchscreen display system according to claim 12, further comprising simulating a valid touch/release selected from connecting/disconnecting the at least one test area to/from ground and connecting/disconnecting the at least one test area to/from a constant potential reference.

18. A touchscreen display system having a touchscreen comprising an active area and a user-touch input area and test areas, said test areas being outside or inside the user-input area, comprising:

an auxiliary controller for providing an instruction to assert the test areas to a state of a validated touch; and a touchscreen controller for providing a response signal corresponding to the validated touch or providing coordinates corresponding to the validated touch, and a compare unit for comparing the response signal directly or indirectly with initial information used for asserting the state or comparing directly or indirectly the corresponding coordinates with coordinates of an initially asserted test area, wherein if said test area is inside the user-input area, the step of comparing the response signal or the coordinates further comprises the step of measuring the touch duration, and wherein the compare unit is external to the touchscreen display system.

19. A touchscreen display system having a touchscreen display comprising an active area and an user-input area, a touchscreen controller and an auxiliary controller, the active area and the user-input area being connected to the touchscreen controller, wherein a part of the active area comprises at least one test area allocated for test operations, said test area being outside or inside of the user-input area, the touchscreen display system being adapted to provide an instruction to assert the at least one test area to a state of validated touch and comprising means for determining congruency between first information relating to an asserted test area and second information derivable from a response of the at least one test area, wherein if said test area is inside the user-input area, the means for determining congruency between the first and second information is further adapted to measure the touch wherein a valid touch/release is simulated selected from connecting/disconnecting the at least one test area to/from ground and connecting/disconnecting the at least one test area to/from to a constant potential reference, further comprising a switch connecting the at least one test area to ground through an adjustable impedance, wherein the adjustable impedance is a plurality of impedances with different values, and the switch is adapted to select one of these impedances.

* * * * *